Feb. 6, 1940.                B. C. MILLER                2,189,738
                             FILM SMOOTHER
                           Filed Aug. 7, 1937
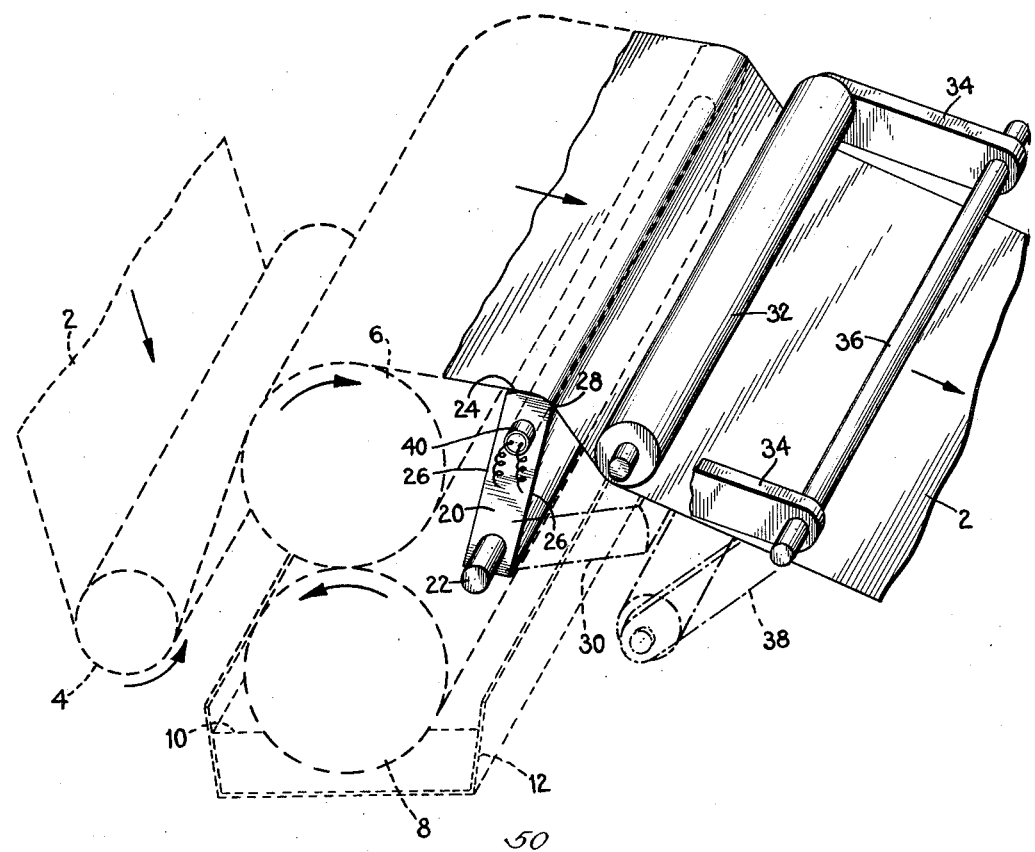
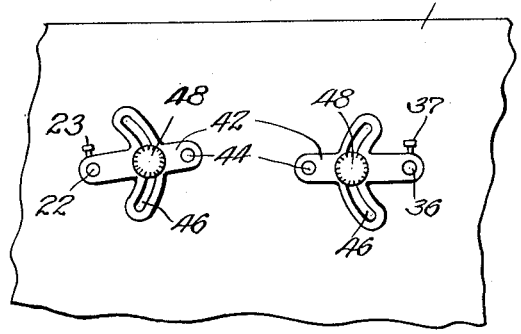
INVENTOR
BERT C. MILLER
BY
Onton and Griswold
ATTORNEY Patented Feb. 6, 1940

2,189,738

UNITED STATES PATENT OFFICE 2,189,738

FILM SMOOTHER

Bert C. Miller, Montclair, N. J., assignor to Bert C. Miller, Inc., New York, N. Y., a corporation of New York Application August 7, 1937, Serial No. 157,899

4 Claims. (Cl. 91—53)

This invention relates to a film smoother for use in conjunction with the apparatus described in my application, Serial Number 116,248 filed Dec. 17, 1936, issued as Patent Number 2,117,200, and for other similar types of apparatus used for the application of liquid coatings that solidify or dry in thin films.

Specifically this invention is particularly directed to a device for leveling or making uniform those films which are applied by heating form a thermoplastic material, as for example those described as resinous and uniformly spreading it on a base, usually a flexible material such as paper.

In the application of resinous coatings by melting them and applying them to paper by means of a roller dipped into the molten bath or by a transfer method of transferring the original film to a second roller and then applying it to the base to be coated, the material is usually spread somewhat non-uniformly despite all efforts to produce a continuous film. It has been found, however, that if this coating as originally applied, is passed over a heated bar of the type herein-after described, and then taken away from that bar along a sharp edge, that the coating can be uniformly distributed and the objectionable "plucking" or other undesirable effects, avoided.

The invention is illustrated with reference to a particular preferred embodiment in Figure 1 shown in the drawing, which represents an isometric view of the apparatus shown in connection with the dotted line illustration of a coating apparatus to which it is attached. Figure 2 is a side elevation of a portion of the apparatus showing the adjusting levers.

In applying molten coatings in the manner described in the application above identified, a web of material 2 is passed under a guide roller 4, and then over a heated coating roller 6, rotating above and in contact with a second heated roller 8, which projects down into a bath 10 of molten resin. The molten resin is retained in a container 12, provided with suitable means for keeping the resin 12 in a molten condition. Conveniently this may be accomplished either by a heater beneath the container 12 or a jacket around it, to which steam or hot oil is supplied. Alternatively an electric heater of some type might be substituted. The apparatus thus far shown is of the type illustrated in my application, Serial Number 116,248, and of course, is subject to variations in construction and the arrangement of parts. For example, the web 2 may pass between rolls 6 and 8 which would serve as nip rolls.

Generically, the basic apparatus is one which will maintain a bath of molten resin and apply this resin as a thin film to a web 2. In operation the roller 8 rotating through the bath of molten resin 10 picks up a film of resin and transfers it to the cooperating roller 6. The thickness of this film and accordingly the applied coating may be determined in a number of ways including controlling the viscosity of the liquid bath as well as by the use of doctor blades or the like on the surface of rollers 8 or 6. The pressure between the rollers and the tension on the web are all contributing factors. As the film on the roller 6 is brought into contact with the web 2 it is transferred thereto, but the web in leaving the roller 6 produces a somewhat roughened surface film because of that characteristic known as "plucking." It is therefore necessary that the coating or film be smoothed before the resin is completely satisfactory. To smooth the film the apparatus shown in full lines in the drawing is employed. This comprises a bar 20 pivoted as at 22. The edge of the bar opposite the pivot 22 is provided with a curved surface 24 which for flat webs would be of the type generated by a straight line. The exact curvature of the surface 24 is not material though conveniently it is of the order equivalent to an arc having a radius about the pivot 22. Other degrees of uniform or varying curvature may be employed. Each end of the arc formed by the curved surface 24 is limited by the sides 26 of the bar 20 and as will be evident, the intersection of the sides 26 with the curved surface 24 at the point 28 provides a sharp edge, at which the paper leaves the curved surface. The bar 20 is adapted to be moved about its pivot 22 to several positions between approximately that shown in full lines and that shown in the broken line position 30.

Also associated with the bar 20 is a roller 32, the ends of which are journaled in bearings provided in arms 34, which in turn may be pivoted at or fixed to a rod 36, forming the center of radius for the movement of the roller 32 in an arc. As in the case of the bar 20, the roller 32 is adapted for movement in an arc about the pivot 36 from a position approximating that shown in full line, to a position such as that shown in broken line indicated as 38.

Both the bar 20 and the roller 32 are adapted to be moved to any position within the confines above mentioned and to be retained in such position.

As shown in Figure 2, the pivot 22 for the smoother bar 20 and the pivot rod 36 for the roller 32 may be journalled in a side plate 50 for the mechanism. The projection of the pivot 22 through the side plate 50 may carry a lever 42 keyed to the pivot 22 by a bolt 23. The lever 42 is provided with an actuating handle 24 and an arcuate slot 46. The lever 42 is held in position by a hand nut 48 threaded to the side plate 50. When the nut 48 is released by unscrewing, the lever 42 may be moved by the handle 44 to any desired position and then held in that position by screwing down on the hand nut 48. The same construction may be used to adjust and retain the roller 32 wherein the rod 36 projecting through the side plate 50 is attached to the lever 42 by the bolt 37. Other adjusting and retaining means may, of course, be substituted for those shown in Figure 2.

Means are provided for heating the bar 20 to a temperature sufficient to maintain the coating on the web 2 in a sufficiently fluid condition in order that it might be smoothed by the curved surface 24 on the bar 20. As illustrated in the figure, this heating means may comprise an electrical heating element 40. This is, of course, only one means for heating the bar 20, since instead of the heating element as illustrated, it is possible to provide suitable ducts within the bar 20 to receive heating fluid, for example, steam or hot oil, or alternatively the electric or other heating element might be placed on the sides of the bar 20 instead of within the bar. The particular type of heating element will usually depend upon the sources of heat available and the special conditions for a given type of coating.

The web 2, after receiving the coating from the roller 6, passes to the curved surface 24 with the film in contact for a short distance, depending upon the relative positions of the bar 20 with reference to the roller 6 and the position of the roller 32. For most efficient operation the film on the web 2 should pass over at least half of the curved surface and then leave abruptly at the sharp edge 28. This is attained by properly positioning the cooperating bar 20 and roller 32. In this manner the film is smoothed while in contact with the curved surface 24, and then leaving it along a sharp line, "plucking" is avoided. In many instances coating applied by the roller 6 will have solidified to a considerable extent by the time that it reaches the smoothing bar 20, in which case a longer time of contact may be necessary before the web is removed from the curved surface 24. In this case, movement of the bar 20, about the pivot 22, in a clockwise direction from the position illustrated will increase the length of time during which the film and the curved surface 24 of the bar 20 are in contact. Likewise, it is possible to vary the angle of the web as it leaves the bar 20, by controlling its relative position with the roller 32. In many instances, the web, after leaving the bar 20, should be substantially at or just slightly less than the angle of a tangent from the surface 24. In other instances, a smaller angle i. e., less than a right angle with the radius is preferred. All of these conditions can be attained by a variation of the relative positions of the bar 20 and the roller 32, as indicated.

While the member 32 is illustrated as a roller it may take any form which will guide the paper without too high resistance.

It will thus be seen that this invention provides a new and useful apparatus for smoothing films applied to webs, particularly where such films are of a thermoplastic type.

While this invention has been illustrated as to certain preferred embodiments thereof, it will be evident that various changes may be made therein without departing from the spirit and scope of the invention as set forth in the appended claims.

What is claimed is:

1. In an apparatus of the class described, the combination comprising a uniformly heated member provided with a curved surface and a sharp edge, a source of heat substantially within the sector defined by the curved surface, in association with a roller whereby a web may pass over the curved surface and leave at the sharp edge under the control of the roller.

2. In an apparatus of the class described for smoothing films on web material, the combination of a uniformly heated member pivoted at one end and provided with a curved surface on the other, said curved surface ending in a sharp edge, means for applying heat to said pivoted member for conduction substantially radially to said curved surface, in cooperation with a roller to guide the web over the curved surface and the sharp edge.

3. In an apparatus of the class described, the combination of a member provided with a curved surface and a sharp edge, means for applying heat to said member for conduction substantially radially to said curved surface to uniformly heat said surface in cooperation with means to guide a web over the uniformly heated curved surface and the sharp edge.

4. In an apparatus of the class described, the combination of a member provided with a curved surface and a sharp edge, means for applying heat to said member for conduction substantially radially to said curved surface to uniformly heat said surface in cooperation with means to guide a web over the uniformly heated curved surface and the sharp edge and means to relatively adjust the member with the curved surface and the guiding means to control the extent of contact between the web and the curved surface and the direction of the web after passing over the sharp edge.

BERT C. MILLER.